United States Patent [19]

Sanford et al.

[11] Patent Number: 5,402,468
[45] Date of Patent: Mar. 28, 1995

[54] TELEPHONE ANSWERING DEVICE WITH STANDARDIZED INTERNAL BUS

[75] Inventors: Robert Sanford, Flower Mound; Robert Cook, Lewisville; Gerald Stuteville, North Richland Hills, all of Tex.

[73] Assignee: Tandy Corporation, Fort Worth, Tex.

[21] Appl. No.: 898,858

[22] Filed: Jun. 15, 1992

[51] Int. Cl.⁶ .......................... H04M 1/64; G06F 3/02
[52] U.S. Cl. ...................................... 379/67; 379/368; 341/22; 341/26
[58] Field of Search ...................... 379/67, 68, 88, 368, 379/369; 341/26, 22; 364/146, 709.01, 709.12

[56] References Cited

U.S. PATENT DOCUMENTS

| | | | |
|---|---|---|---|
| 4,304,968 | 12/1981 | Klausner et al. | 379/70 |
| 4,706,274 | 11/1987 | Baker et al. | 379/160 |
| 4,975,896 | 12/1990 | D'Agosto, III et al. | 379/94 |
| 5,151,554 | 9/1992 | Matsuda | 341/26 |
| 5,220,601 | 6/1993 | Gulick et al. | 341/26 |

*Primary Examiner*—James L. Dwyer
*Assistant Examiner*—Fan Tsang
*Attorney, Agent, or Firm*—Winstead Sechrest & Minick

[57] ABSTRACT

The invention comprises a telephone answering device in which a microprocessor controller is coupled to all of the peripheral components through a single common multi-bit data/instruction bus and each peripheral component is coupled to the data bus through a latch which is enabled responsive to an enable instruction placed on a port of the controller.

13 Claims, 1 Drawing Sheet

TELEPHONE ANSWERING DEVICE WITH STANDARDIZED INTERNAL BUS

FIELD OF THE INVENTION

The invention pertains to telephone answering devices. More particularly, the invention relates to a standardized bus structure for use in telephone answering devices which can be easily and inexpensively adapted to various embodiments.

BACKGROUND OF THE INVENTION

Telephone answering devices are commonly controlled by microprocessors. The microprocessor typically controls a multiplicity of peripheral components of the telephone answering device which may include, for instance, an LCD or LED display, a recording and playback device, indicator lights, a DTMF (Dual Tone Multi-Frequency) receiver and an audio controller. Input and/or output ports of the microprocessor are hardwired to the peripheral component that it controls.

Typically, a plurality of ports are dedicated to each peripheral component for controlling various functions of that component. For instance, U.S. Pat. No. 4,400,586 discloses a typical prior art telephone answering device having a microprocessor which is connected to the various peripheral components of the device through a plurality of ports. A port on the microprocessor and an associated lead are provided for each data or instruction bit needed to control and/or provide data to each peripheral component.

This type of design has several drawbacks. First, telephone answering device manufacturers commonly improve and update their products from time to time to add features and, consequently, components to earlier models. A telephone answering device designed with a communication/control configuration as described above requires substantial hardware redesign if it is desired to add additional peripheral components and functions. In order to add additional components and functions, pins must be added to the microprocessor and conductor leads must be added between those pins and the new components. Accordingly, minor updating or modifying of telephone answering devices required sometimes significant hardware redesign. Accordingly, it is an object of the present invention to provide an improved peripheral component control structure for a telephone answering device.

It is a further object of the present invention to provide a telephone answering device with a standardized internal bus.

It is another object of the present invention to provide a telephone answering device which can be modified easily and inexpensively to add or change peripheral components.

It is yet another object of the present invention to provide a telephone answering device which can be modified to add additional peripheral components and functions without adding significant additional data lines or ports to the microprocessor controller.

SUMMARY OF THE INVENTION

The telephone answering device of the present invention comprises a standardized multi-bit internal data/instruction bus coupled between the microprocessor controller of the telephone answering device and a plurality of peripheral components such as an LCD display, an audio controller, and indicator lights. Each peripheral component which is to receive data and/or instructions from the microprocessor includes an associated latch coupled between the peripheral component and the data bus. The data bus is coupled to the latch of each such peripheral component. Each latch also comprises an enable input which is coupled to a port of the microprocessor. Accordingly, the microprocessor uses one pin for each peripheral component for enabling the associated latch and has a single multi-bit data bus shared by all peripheral components. The number of bits in the data bus is dictated by the peripheral component requiring the most data and/or control inputs to serve its function.

When the microprocessor sends data or instructions to a peripheral component, it places data on the data bus and sends an enable signal out on the port coupled to the latch associated with the peripheral component for which the data is intended. The data is latched by the enabled latch and the data passes through that latch to the peripheral component for which it was intended. Meanwhile, the other peripheral components are not affected by the data since their associated latches are not enabled.

More peripheral components can be added to the telephone answering device by coupling the components to the data bus through a latch and adding one pin and lead between the microprocessor and the associated latch. Accordingly, hardware redesign is minimal.

The data bus preferably is a two-way bus to which the operating buttons of the telephone answering device are also coupled. The operating buttons are coupled to the bus without the use of an interfacing latches. Blocking diodes coupled between the buttons and the bus prevent the buttons from affecting the bus during operation of any of the other peripheral components. The buttons are electrically coupled in a matrix of rows and columns. The row outputs are coupled to the data bus and the columns are coupled to separate ports of the microprocessor. At predetermined intervals, all latches are disenabled and each column is individually set to a first state while the remaining columns remain in a second state. The rows (i.e., the data bus bits) are then scanned by the microprocessor in order to determine the state of all of the buttons. All latches are not enabled during the interval when the buttons are scanned.

DETAILED DESCRIPTION OF THE PREFERRED EMBODIMENT

Figure 1:
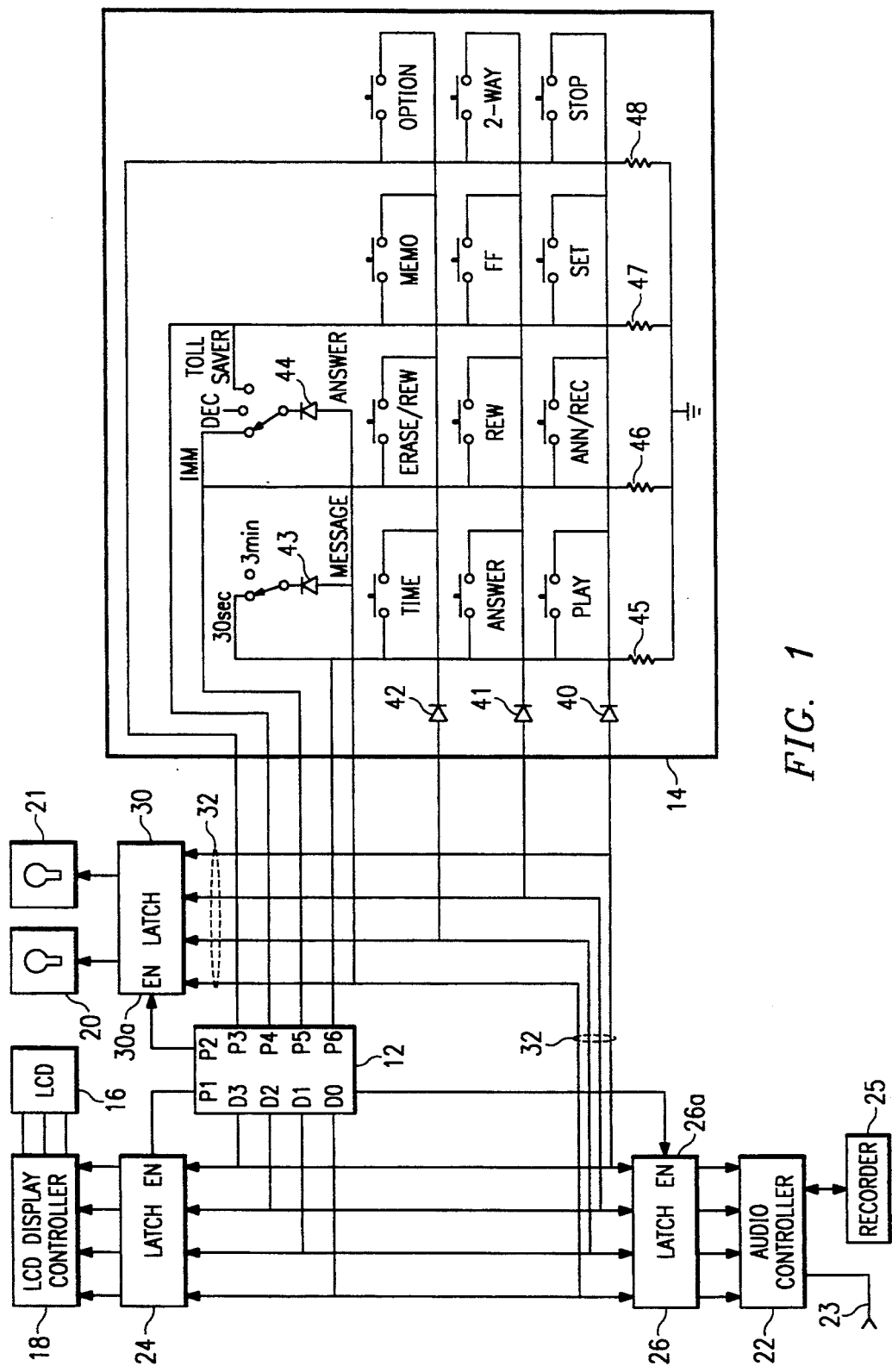
FIG. 1 is a partial block and partial schematic diagram illustrating one particular embodiment of the internal bus structure of the present invention.

FIG. 1 is a generalized block diagram showing the internal components of an exemplary telephone answering device. Digital controller 12 is a microprocessor programmed to operate the telephone answering device responsive to a limited number of parameters selected by the user through a series of input buttons, switches and/or keys (hereinafter buttons). The collection of input buttons is shown in FIG. 1 at 14. A telephone answering device typically will comprise buttons for allowing the user to select various different operating modes such as answer mode, playback mode, rewind, fast forward, voice memo, and erase. The operator also may be allowed to set the number of rings before the answering device lifts the switch hook, to turn the device on from a remote telephone, to listen to messages from a remote telephone, etc. In accordance with its programming and the data input to it through the buttons, the microprocessor controller 12 controls the various peripheral components of the answering machine so as to cause the components to operate as needed. Such peripheral components may include, for instance, an LCD display 16 which is controlled by an associated LCD display controller 18, indicator lights 20 and 21 for indicating the mode of operation of the device and an audio controller 22 for directing audio signals such as, for instance, from a telephone line 23 to the recorder 25 or vice versa.

In the present invention, each of these peripheral components is coupled to receive data and/or instructions from the controller 12 over a data/instruction bus 32 through an associated latch. For instance, latch 24 is associated with the LCD 16 and LCD controller 18, latch 26 is associated with audio controller 22 and latch 30 is associated with indicator lights 20 and 21. Each latch 24, 26 and 30 has an enable input coupled to a separate port of the microprocessor 12.

In at least one preferred embodiment, communication between the controller 12 and the peripheral components (18, 20, 21, 26) is performed over a four bit data/instruction bus 32 comprising bits D0–D3. Each latch 24, 26 and 30 is coupled to receive data and/or instructions over the bus 32. Each latch, however, only passes data through to the corresponding peripheral component when its ENABLE input (clock input) is asserted. One port of microprocessor 12 is dedicated to each latch and is coupled to the ENABLE input of the latch. For instance, as shown in FIG. 1, port P0 of microprocessor 12 is coupled to latch enable input 26a of latch 26, port P1 is coupled to latch enable input 24a of latch 24, and port P2 is coupled to latch enable input 30a of latch 30. As will be discussed in detail herein, ports P3–P6 receive data from the buttons 14.

When the microprocessor must control a particular device, it places the necessary data on the data bus 32 and places an enable signal at the port, P0, P1 or P2, corresponding to the latch of the peripheral component for which the data is intended. In this manner, the data is received by only one peripheral component through the enabled latch while the remaining peripheral components are not affected by the data because their latches are not enabled. Accordingly data cannot pass through those latches to the corresponding peripheral component. Depending on the particular peripheral component, anywhere from one to all of the bits of the data bus may be used to provide relevant data or instructions.

Further, it should be understood that the data contained in any one or more bits of the bus 32 at any given time may comprise data and/or instruction bits depending on the particular peripheral component. For instance, any information sent to latch 30 for controlling indicator lights 20 and 21 would comprise purely instructions and no data (e.g., turn light 20 on and make light 21 blink intermittently).

By using a bus structure as opposed to dedicated data and/or instruction ports for each peripheral component, the overall number of data and instruction leads in the device is reduced. As long as the data bus comprises enough bits to accommodate the peripheral component requiring the most data/instruction input bits, peripheral components can be added to the system by simply coupling them to the existing data bus through a latch and adding a single port to the microprocessor 12 and a lead coupling the new port to the ENABLE input of the latch. Accordingly, the hardware saving advantage of the data bus structure of the present invention is particularly apparent as the number of peripheral components which must be controlled increases. As the number of peripheral components increases, only a single additional port pin is added for each additional peripheral component in order to control the corresponding latch.

A telephone answering device which has already been designed and manufactured can be modified to add features and peripheral components with significantly less hardware revisions than in the prior art dedicated port type system. Peripheral components can be added without the need to add any additional data/instruction pins on the controller or data lines between the microprocessor 12 and the new peripheral component. It is only necessary to add an enable port and an associated line between the controller and the latch which will be associated with the peripheral component.

Obviously, not all peripheral components will require all of the bits on the bus. In such a case, the microprocessor need place data only on some of the bits of the bus and only the corresponding bits of the bus need be connected to the data inputs of the associated latch and only the relevant output bits of the latch need be connected to the peripheral component. For instance, as shown in FIG. 1, in this particular embodiment of the invention, there are only two indicator lights, each of which has only two modes (e.g., on or off). Accordingly, there are only two output bits from latch 30 to the indicator lights 20. Although all four bits of the bus are connected to latch 30, it should be understood that only two bits of the bus need be connected to that latch.

The buttons, switches and keys for operating the telephone answering device of the present invention are shown in box 14 of FIG. 1. As shown therein, the buttons are arranged in a four row/four column matrix. The four row outputs of the matrix are coupled through diodes 40, 41, 42, 43 and 44 to the four bits of the data bus 32. Diodes 43 and 44 are both coupled to the first row. The diodes prevent the buttons, switches and keys from affecting data/instruction on the bus. The columns are coupled to matrix ports P3, P4, P5 and P6 of the controller 12. The columns are normally bias low by resistors 45, 46, 47 and 48.

The buttons, switches and keys are observed by the microprocessor in a manner as described below. Specifically, at specified intervals, e.g., every 10 microseconds, all of the latches corresponding to the peripheral components are turned off for a specified period so that data on the bus during this interval will not affect the peripheral components. During this period, all of the leads of the bus are set low except for one which is set high. The condition of the matrix ports P3, P4, P5 and P6 are then read by the microprocessor. The high signal on the selected bus lead will be passed by any activated, i.e., closed circuited, buttons in the row corresponding to the high lead through to the matrix port corresponding to the column containing that activated button. Since the remaining leads of the bus are set low, the buttons in the rows corresponding to all other leads of the bus will pass a low signal to the column regardless of whether the corresponding button is activated or not. Accordingly, the state of the buttons in the row corresponding to the high lead of the bus can be determined by the microprocessor by observing the matrix ports. The process is repeated for each lead of the bus. The state of all of the buttons within block 14 is thus determined.

The microprocessor 12 is programmed to respond accordingly and operate the peripheral components in accordance with the condition of the buttons. The data placed on the bus by the buttons will not affect the operation of any of the peripheral components because their latches are not enabled during scanning of the buttons.

Having thus described a few particular embodiments of the invention, various alterations, modifications and improvements will readily occur to Those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A telephone answering device comprising:
   a plurality of peripheral components for performing functions of said telephone answering device,
   a controller, including a plurality of controller bus ports and a separate latch-control port corresponding to each of said peripheral components, for generating at the controller bus ports data and instructions for controlling said peripheral components, for generating latch-disabling signals at the latch-control ports corresponding to the peripheral components for which the data and instructions have been generated and for generating latch-disabling signals at other latch-control ports,
   a data/instruction bus comprising a plurality of leads coupled in common between said controller bus ports and each of said peripheral components providing a path through which said data and instructions generated by said controller can be sent to said peripheral components, and
   a plurality of latches, each latch corresponding to one of said peripheral components and one of said latch-control ports and coupled between said peripheral component corresponding thereto and said bus, each latch including a latch-enable port, coupled to the latch-control port to which that latch corresponds, for forwarding data and instructions from the data/instruction bus to the peripheral component corresponding thereto in response to enabling signals at its enable port but not in response to disabling signals thereat.

2. A telephone answering device as set forth in claim 1 wherein said controller comprises a microprocessor.

3. A telephone answering device as set forth in claim 1 wherein said peripheral components include at least an LCD display, indicator lights and an audio controller.

4. A telephone answering device as set forth in claim 1 wherein:
   said answering device further includes: at least one means for inputting data to said telephone answering device and means for coupling said inputting means to said controller, and
   said controller includes means for receiving and processing data from said inputting means.

5. A telephone answering device as set forth in claim 4 wherein:
   said means for coupling said inputting means to said controller comprises a plurality of input ports,
   said means for inputting comprises a plurality of buttons coupled in a matrix comprising columns and rows, each row being coupled to a lead of said bus and each column being coupled to a matrix port of said controller, each of said buttons in said matrix being coupled between one of said rows and one of said columns and operable to be placed in either an open circuited state or a closed circuited state, and
   said means for inputting further comprises means for isolating said buttons from affecting the data and instructions on said bus.

6. A telephone answering device as set forth in claim 5 wherein said means for isolating comprises at least one blocking diode per row coupled between said buttons and said bus.

7. A telephone answering device as set forth in claim 6 wherein:
   said means for inputting further comprises means for biasing said columns to a first state, and
   said controller further comprises means for setting all but a selected one of said bus leads to said first state and setting said selected one bus lead to a second state such that only a column containing a closed-circuited button in the row corresponding to said selected one bus lead is set to said second state, while all other columns are set to said first state.

8. A telephone answering device as set forth in claim 7 wherein said means for coupling further comprises means within said controller for selectively setting each of said bus leads to said second state while all other of said bus leads are maintained in said first state.

9. A method of controlling a plurality of peripheral components of a telephone answering machine coupled to a controller through a common multi-lead bus, said controller generating data intended for said peripheral components, and for receiving instructions from inputting means comprising a plurality of buttons coupled in a matrix comprising columns and rows, each row of said matrix being coupled to a lead of said bus, each of said buttons in said matrix being coupled between one of said rows and one of said columns and operable to be placed in either an open circuited state or a closed circuit state, comprising the steps of:
   A) controlling said peripheral components by:
      i) placing data intended for at least one of said peripheral components on said bus,
      ii) enabling at least one of said peripheral components to receive said data, and
      iii) disabling all other of said peripheral components from receiving said data, and
   B) receiving instructions from the inputting means by:
      i) disabling all of said peripheral components from receiving said data, and
      ii) observing said inputting means to determine its condition by:
         a) biasing said columns of buttons with a preselected voltage to a first state,
         b) setting all but a selected one of said bus leads to said first state,
         c) setting said selected one bus lead to a second state, a column containing a closed-circuited button in the row corresponding to said selected bus lead is set to said second state while all other columns are set to said first state, and d) observing said columns to determine which of said buttons are closed circuited.

10. A method as set forth in claim 9 further comprising repeating steps a, b, c, and d such that each of said bus leads is sequentially set to said second state while all other of said bus leads are maintained in said first state.

11. A telephone answering device comprising:
A) a plurality of peripheral components including:
   i) a display control unit,
   ii) at least one indicator light, and
   iii) an audio control unit for directing audio signals in said telephone answering device,
B) a microprocessor for generating data and instructions for controlling said peripheral components,
C) a data/instruction bus comprising a plurality of leads coupled in common between said microprocessor and said peripheral components and providing a path through which said data and instructions generated by said microprocessor can be sent to said peripheral components,
D) a plurality of latches, each latch corresponding to one of said peripheral components, said latch coupled between the peripheral component corresponding thereto and said bus,
E) a plurality of latch control ports on said microprocessor, each latch control port corresponding to one of said latches and coupled to an enable input of the latch to which that latch control port corresponds,
F) means in said microprocessor for placing said data and instructions on said bus, and
G) means in said microprocessor for selectively placing an ENABLE LATCH signal on one of said latch enable ports corresponding to one of said peripheral components for which data or instructions placed on said bus are intended, said ENABLE LATCH signal enabling the corresponding latch whereas all other latches are not enabled.

12. A telephone answering device as set forth in claim 11 further comprising:
a plurality of input ports on said microprocessor;
a plurality of buttons for inputting data into said telephone answering device, said buttons being coupled in a matrix comprising columns and rows, and each row being coupled to a lead of said bus and each column being coupled to a matrix port of said microprocessor, each of said buttons in said matrix being coupled between one of said rows and one of said columns and operable to be placed in either an open circuited state or a closed circuited state,
at least one blocking diode per row coupled between said buttons and said bus,
means for disenabling all of said latches for a specified period at specific intervals,
means including bias leads for biasing said columns to a first state, and
means for setting selected ones of said bias leads to said first state and another one of said bias leads to a second state, a closed-circuited one of said buttons in said row coupled to said another one of said leads passing a voltage corresponding to said second state through said column coupled to said closed-circuited button to a corresponding said input port of said microprocessor.

13. A telephone answering device as set forth in claim 12 wherein said means for setting further comprises means within said microprocessor for selectively setting each of said bus leads to said second state while all other of said bus leads are maintained in said first state.

* * * * *